United States Patent
Mclennaghan et al.

(10) Patent No.: US 10,442,924 B2
(45) Date of Patent: Oct. 15, 2019

(54) COMPOSITIONS CONTAINING LOW MOLECULAR WEIGHT PROPYLENE-BASED POLYMERS

(71) Applicant: Dow Global Technologies LLC, Midland, MI (US)

(72) Inventors: Allan Walter Mclennaghan, Lachen (CH); Yi Jin, Missouri City, TX (US); Jozef Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 75 days.

(21) Appl. No.: 15/574,268

(22) PCT Filed: Jul. 22, 2016

(86) PCT No.: PCT/US2016/043631
§ 371 (c)(1),
(2) Date: Nov. 15, 2017

(87) PCT Pub. No.: WO2017/019529
PCT Pub. Date: Feb. 2, 2017

(65) Prior Publication Data
US 2018/0201773 A1    Jul. 19, 2018

Related U.S. Application Data

(60) Provisional application No. 62/196,342, filed on Jul. 24, 2015.

(51) Int. Cl.
| | | |
|---|---|---|
| C08L 23/12 | (2006.01) | |
| C08F 210/06 | (2006.01) | |
| C08L 23/14 | (2006.01) | |
| C09J 123/14 | (2006.01) | |

(52) U.S. Cl.
CPC .......... C08L 23/142 (2013.01); C08F 210/06 (2013.01); C08L 23/12 (2013.01); C09J 123/142 (2013.01); C08F 2500/01 (2013.01); C08F 2500/08 (2013.01); C08F 2500/15 (2013.01); C08F 2500/17 (2013.01); C08L 2207/10 (2013.01)

(58) Field of Classification Search
CPC .......... C08L 23/12; C08L 23/18; C08L 23/20; C08F 210/06; C08F 210/08; C08F 210/14; C08F 2500/08; C08F 2500/17
See application file for complete search history.

(56) References Cited

U.S. PATENT DOCUMENTS

| | | | |
|---|---|---|---|
| 4,072,812 A | 2/1978 | McConnell et al. | |
| 6,582,762 B2 | 6/2003 | Faissat et al. | |
| 6,627,723 B2* | 9/2003 | Karandinos | C09J 123/10 526/348 |
| 6,747,114 B2* | 6/2004 | Karandinos | C09J 123/10 526/348.2 |
| 7,521,507 B2 | 4/2009 | Lewtas et al. | |
| 8,383,731 B2 | 2/2013 | Lewtas et al. | |
| 8,420,760 B2 | 4/2013 | Hughes et al. | |
| 8,536,268 B2* | 9/2013 | Karjala | C08F 10/00 524/570 |
| 9,200,185 B2* | 12/2015 | Knutson | C09J 123/142 |
| 2009/0105407 A1* | 4/2009 | Karjala | C08F 10/00 524/547 |
| 2010/0132886 A1* | 6/2010 | Rodriguez | C09J 123/14 156/334 |
| 2017/0240781 A1* | 8/2017 | McLennaghan | C09J 123/16 |

FOREIGN PATENT DOCUMENTS

| | | |
|---|---|---|
| WO | 2006/069205 A1 | 6/2006 |
| WO | 2012/149391 A1 | 11/2012 |
| WO | 2014/209256 A1 | 12/2014 |
| WO | 2015/006456 A1 | 1/2015 |
| WO | 2016/028961 A1 | 2/2016 |
| WO | 2017/058627 A1 | 4/2017 |

OTHER PUBLICATIONS

PCT/US2016/043631, International Search Report dated Feb. 2, 2017.
PCT/US2016/043631, Written Opinion of the International Search Authority dated Feb. 2, 2017.
PCT/US2016/043631, International Preliminary Report on Patentability dated Jan. 30, 2018.

* cited by examiner

*Primary Examiner* — Rip A Lee
(74) *Attorney, Agent, or Firm* — Quarles & Brady LLP

(57) ABSTRACT

The present disclosure provides a composition comprising: A) a propylene/C4-C10 alpha-olefin interpolymer; (i)) a total unsaturation per mole of propylene from 0.010% to 0.030%, (ii) a density from 0.855 g/cc to 0.890 g/cc, and (iii) a melt viscosity, at 177 C, from 500 cP to 200,000 cP.

10 Claims, No Drawings

COMPOSITIONS CONTAINING LOW MOLECULAR WEIGHT PROPYLENE-BASED POLYMERS

REFERENCE TO RELATED APPLICATIONS

The present application claims the benefit of U.S. Provisional Application No. 62/196,342, filed on Jul. 24, 2015, and incorporated herein by reference.

BACKGROUND

Formulated polymer compositions are used for adhesives. Typically for an adhesive, there is a need to balance two opposing requirements: the need for an adhesive with high cohesion (for example, as determined by Peel Force), and the need for low adhesive viscosity. Polymer compositions for use in adhesives and other compositions are disclosed in the following references: U.S. Pat. Nos. 6,627,723, 6,747,114, 7,521,507, 6,582,762, 8,383,731; WO 2016/029006, WO 2016/029012, and WO 2016/028961. However, there is a need for new polymer compositions that have high flow and high cohesive strength. These needs have been met by the following invention.

SUMMARY OF INVENTION

The invention provides a composition comprising:
A) a propylene/C4-C10 alpha-olefin interpolymer comprising the following properties:
(i) a total unsaturation per mole of propylene from 0.010% to 0.030%,
(ii) a density from 0.855 g/cc to 0.890 g/cc, and
(iii) a melt viscosity, at 177° C., from 500 cP to 200,000 cP.

DETAILED DESCRIPTION

As discussed above, the invention provides a composition comprising:
A) a propylene/C4-C10 alpha-olefin interpolymer, and further a propylene/C4-C10 alpha-olefin copolymer; and wherein propylene/C4-C10 alpha-olefin interpolymer comprises the following properties:
(i) a total unsaturation per mole of propylene from 0.010% to 0.030%,
(ii) a density from 0.855 g/cc to 0.890 g/cc, and
(iii) a melt viscosity, at 177° C., from 500 cP to 200,000 cP, further from 500 to 50,000 cP, further from 500 to 20,000 cP.

The composition may comprise a combination of two or more embodiments described herein.

The propylene/C4-C10 alpha-olefin interpolymer may comprise a combination of two or more embodiments as described herein.

In one embodiment, the propylene/C4-C10 alpha-olefin interpolymer further comprises an isotacticity (mm) greater than 0.85, or greater than 0.87, or greater than 0.90.

In one embodiment, the composition further comprises the following:
B) at least one tackifier;
C) optionally, at least one oil;
D) optionally at least one wax.

In one embodiment, the propylene/C4-C10 alpha-olefin interpolymer has a g' value (at Mn)>0.98, or >0.99, or =1.00. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a melt viscosity, at 177° C., from 500 cP to 50,000 cP, or from 1000 cP to 40,000 cP, or from 1500 cP to 30,000 cP, or from 2,000 to 20,000 cP, or from 2,000 to 10,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a melt viscosity, at 177° C., from 500 cP to 15,000 cP, or from 1,000 to 10,000 cP, or from 2,000 to 8,000 cP, or from 3,000 to 6,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a weight average molecular weight (Mw) from 10,000 to 500,000 g/mole, or from 15,000 to 100,000 g/mole, or from 20,000 to 60,000 g/mole. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a number average molecular weight (Mn) from 2,000 to 200,000 g/mole, or from 2,000 to 100,000 g/mole, or from 2,000 to 50,000 g/mole, or from 2,000 to 20,000 g/mole, or from 2,000 to 10,000 g/mole. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a density from 0,855 g/cc to 0.890 g/cc, or from 0.855 g/cc to 0.880 g/cc, or from 0.860 g/cc to 0.875 g/cc, or from 0.860 g/cc to 0.870 g/cc (1 cc=1 cm$^3$). In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer comprises from 5.0 wt % to 50.0 wt %, or from 8.0 to 40.0 wt %, or from 7.0 to 35.0 wt %, or from 10.0 to 30.0 wt % units derived from the C4-C10 alpha-olefin. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer comprises from 5.0 wt % to 30.0 wt %, or from 6.0 to 25.0 wt %, or from 7.0 to 20.0 wt %, or from 7.0 to 15.0 wt % units derived from the C4-C10 alpha-olefin. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer comprises from 5.0 wt % to 40.0 wt %, or from 5.0 to 30.0 wt %, or from 5.0 to 20.0 wt % units derived from the C4-C10 alpha-olefin. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer comprises from 5.0 wt % to 25.0 wt %, or from 5.0 to 20.0 wt %, or from 5.0 to 15.0 wt % units derived from the C4-C10 alpha-olefin. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer comprises from 5.0 wt % to 15.0 wt %, or from 5.0 to 10.0 wt %, or from 5.0 to 8.0 wt % units derived from the C4-C10 alpha-olefin. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a melting temperature (Tm) from 45° C. to 85° C., or from 50° C. to 80° C., or from 55° C. to 75° C., or from 60° C. to 70° C. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a crystallization temperature (Tc) from −15° C. to −2° C., or from −13° C. to −4° C., or from −11° C. to −6° C. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melting temperature (Tm) from 45° C. to 85° C., or from 50° C. to 80° C., or from 55° C. to 75° C., or from 60° C. to 70° C. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a crystallization temperature (Tc) from −15° C. to −2° C., or from −13° C. to −4° C., or from −11° C. to −6° C. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a crystallization temperature (Tc) from 20° C. to 90° C. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition comprises from 5 wt % to 40 wt %, or from 7 wt % to 35 wt %, or from 10 wt % to 30 wt % tackifier, based on the weight of the composition. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition comprises from 5 wt % to 35 wt %, or from 7 wt % to 30 wt %, or from 10 wt % to 25 wt % tackifier, based on the weight of the composition. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition comprises from 5 wt % to 30 wt % or from 6 wt % to 25 wt %, or from 7 wt % to 20 wt %, or from 8 wt % to 15 wt %, oil, based on the weight of the composition. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition further comprises a propylene-based polymer wax that has a density 0.89 g/cc to 0.91 g/cc.

In one embodiment, the composition has a melt viscosity, at 150° C., from 500 cP to 200,000 cP, or from 1,000 cP to 100,000 cP, or from 2,000 cP to 60,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 150° C., from 500 cP to 80,000 cP, or from 1,000 cP to 60,000 cP, or from 2,000 cP to 40,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 150° C., from 500 cP to 50,000 cP, or from 500 cP to 40,000 cP, or from 500 cP to 30,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 150° C., from 500 cP to 20,000 cP, or from 500 cP to 10,000 cP, or from 500 cP to 5,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 150° C., from 500 cP to 8,000 cP, or from 1,000 cP to 6,000 cP, or from 1,500 cP to 5,000 cP, or from 2,000 cP, or from 2,000 cP to 4,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 177° C., from 500 cP to 200,000 cP, or from 1,000 cP to 100,000 cP, or from 2,000 cP to 60,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 177° C., from 500 cP to 80,000 cP, or from 1,000 cP to 60,000 cP, or from 2,000 cP to 40,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 177° C., from 500 cP to 50,000 cP, or from 500 cP to 40,000 cP, or from 500 cP to 30,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 177° C., from 500 cP to 20,000 cP, or from 500 cP to 10,000 cP, or from 500 cP to 5,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition has a melt viscosity, at 177° C., from 500 cP to 8,000 cP, or from 1,000 cP to 6,000 cP, or from 1,500 cP to 5,000 cP, or from 2,000 cP, or from 2,000 cP to 4,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition comprises from 1.0 to 70.0 wt % of the propylene/C4-C10 alpha-olefin interpolymer; from 1.0 to 60.0 wt % of a tackifier, and from 0 to 40.0 wt % of an oil; each wt % based on the weight of the composition. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition further comprises one or more additives selected from antioxidants (for example, IRGANOX 1010, IRGANOX 1076, and/or IRGAFOS 168), waxes, nucleating agents, tackifiers, or other olefin-based polymers (for example, polyisobutylene). In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the composition comprises ≥50 wt %, or ≥55 wt %, or ≥60 wt %, or ≥65 wt %, or ≥70 wt %, or ≥75 wt %, or ≥80 wt %, or ≥85 wt %, or ≥90 wt %, of ≥95 wt %, or ≥98 wt %, of the propylene/C4-C10 alpha-olefin interpolymer, based on the weight of the composition. In a further embodiment, the interpolymer is a propylene/C4-C10 alpha-olefin copolymer. In a further embodiment, the alpha-olefin is a C6 or C8 alpha-olefin, and further a C8 alpha-olefin.

The invention also provides an article comprising at least one component formed from the composition of one or more embodiments described herein.

In one embodiment, the article is a wire, a cable, a building material, a coated fabric, a medical device, a hygiene article, a toy or sporting good, a belt or hose, weather striping, a gasket, a footwear component, a floor tile, a carpet, a geomembrane, a pond or pool liner, insulation, an automotive component, or a carboard box.

In one embodiment, the article is an laminate, a multi-layered film, book, sealant, a molded good, a piece of furniture, a roofing tile, a molding or trim, a window, a door, or a luggage or leather good.

In one embodiment, the article further comprises a substrate. In a further embodiment, the substrate is a non-woven fabric.

In one embodiment, the composition forms a seal between the at least one surface of the substrate and at least one surface of another substrate.

In one embodiment, the substrate is a component of a hygiene article.

In one embodiment, the substrate is wood.

In one embodiment, the substrate is selected from paper, cardboard, fabric or plastic or metal.

An inventive composition may comprise a combination of two or more embodiments as described herein.

Propylene/C4-C10 Alpha-Olefin Interpolymer

In one embodiment, the propylene/C4-C10 alpha-olefin interpolymer comprises from a lower limit of 1.0, or 5.0, or 10.0 wt %, to an upper limit of 10, or 20, or 30.0, or 40.0, or 50.0 wt %, of the C4-C10 alpha-olefin; each wt % based on the weight of the interpolymer. In a further embodiment, the interpolymer is a propylene/C4-C10 alpha-olefin copolymer. In a further embodiment, the alpha-olefin is a C6 or C8 alpha-olefin, and further a C8 alpha-olefin.

The catalyst of Group IV metal complex of a polyvalent aryloxyether imparts unique properties to the propylene/C4-C10 alpha-olefin interpolymer. In one embodiment, the propylene/C4-C10 alpha-olefin interpolymer is characterized as having substantially isotactic propylene sequences. "Substantially isotactic propylene sequences" means the sequences have an isotactic triad (mm) measured by $^{13}$C NMR of greater than 0.85, or greater than 0.90, or greater than 0.92, or greater than 0.93. Isotactic triads refer to the isotactic sequence in terms of a triad unit in the copolymer molecular chain determined by $^{13}$C NMR spectroscopy. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a total unsaturation, per mole of propylene, from 0.010 mol % to 0.030 mol %, or from 0.0105 to 0.025%, or from 0.010% to 0.020%. The total unsaturation per total mole of propylene is measured by $^1$H NMR analysis as described below. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a melt viscosity, at 177° C., from 500 centipoise (cP), or 1000 cP, or 1500 cP, or 2000 cP, or 2500 cP, or 3000 cP, to 6000 cP, or 8000 cP, or 10000 cP, or 15,000 cP, or 20,000 cP, or 25,000 cP, or 30,000 cP. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a crystallinity in the range from 1 wt % to 40 wt %. For example, the crystallinity can be from 1 wt %, or 2 wt %, or 5 wt %, or 10 wt %, to 15 wt %, or 20 wt % or 25 wt %, or 30 wt %, or 35 wt %, or 40 wt %. Crystallinity is measured via DSC method, as described below in the test methods section. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the alpha-olefin of the propylene/C4-C10 alpha-olefin interpolymer is a C4-C8 alpha-olefin, or a $C_4$, $C_6$ or $C_8$ alpha-olefin. In a further embodiment, the interpolymer is a propylene/$C_4$, $C_6$ or $C_8$ alpha-olefin copolymer. In a further embodiment, the alpha-olefin is a C6 or C8 alpha-olefin, and further a C8 alpha-olefin.

In one embodiment, the alpha-olefin of the propylene/C4-C10 alpha-olefin interpolymer is a C4-C8 alpha-olefin, or a $C_6$ or $C_8$ alpha-olefin. In a further embodiment, the interpolymer is a propylene/$C_6$ or $C_8$ alpha-olefin copolymer, and further a propylene/$C_8$ alpha-olefin copolymer.

In one embodiment, the propylene/C4-C10 alpha-olefin interpolymer has a density from 0.855 g/cc to 0.890 g/cc, or from 0.860 g/cc to 0.880 g/cc, or from 0.860 g/cc to 0.870 g/cc. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has melting temperature, Tm, from 30° C. to 120° C., or from 50° C. to 100° C., or from 55° C. to 80° C., or from 55° C. to 75° C. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a weight average molecular weight (Mw) from 10,000 to 500,000 g/mole, or from 20,000 to 100,000 g/mole, or from 20,000 to 60,000 g/mole. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer has a Mw/Mn from 2.0 to 4.0, or from 2.0 to 3.5, or from 2.0 to 3.0, or from 2.0 to 2.5. In a further embodiment, the interpolymer is a propylene/C4-C10 alpha-olefin copolymer. In a further embodiment, the alpha-olefin is a C6 or C8 alpha-olefin, and further a C8 alpha-olefin.

In one embodiment, the propylene/C4-C10 alpha-olefin interpolymer is present in the composition in an amount from 40 wt %, or 50 wt %, or 60 wt %, to 70 wt %, or 80 wt %, or 90 wt %, or 95 wt %, or 99 wt %, based on weight of the composition. In a further embodiment, the interpolymer is a propylene/C4-C10 alpha-olefin copolymer. In a further embodiment, the alpha-olefin is a C6 or C8 alpha-olefin, and further a C8 alpha-olefin.

The propylene/C4-C10 alpha-olefin interpolymer may comprise two or more embodiments disclosed herein. The propylene/C4-C10 alpha-olefin copolymer may comprise two or more embodiments disclosed herein.

Propylene/C4-C10 Alpha-Olefin Interpolymer Catalyst

The propylene/C4-C10 alpha-olefin interpolymer is made with a (i) catalyst that is a Group IV metal complex of a polyvalent aryloxyether, (ii) an activator, and/or (iii) a cocatalyst. The catalyst is capable of producing polymers from propylene containing monomer mixtures having extremely high molecular weight and isotacticity, at catalyst efficiencies of greater than 0.5 $g_{polymer}/\mu g_{metal}$, allowing the use of a chain transfer agent to control molecular weight, without sacrificing molecular weight distribution. A sufficient quantity of chain transfer agent is used, so that a substantial decrease in molecular weight (>30 percent) occurs, compared to a comparative polymerization without the use of chain transfer agent. When the chain transfer agent is hydrogen, at least 0.01 mol percent (based on propylene) is used, and a maximum of about 2 mole percent is used. Highly isotactic polymers can be prepared with high levels of chain transfer agents, while still affording narrow molecular weight distribution polymers, and using low levels of alumoxane activators. It has been discovered that certain catalysts, in combination with a chain transfer agent, will result in desired unsaturation levels. Generally, use of high levels of chain transfer agent with more conventional catalysts, results in production of polymers having broadened molecular weight distributions. Nonlimiting examples of suitable Group IV metals include titanium, zirconium, and hafnium.

In an embodiment, the Group IV metal complex is a hafnium-based polyvalent aryloxyether. Nonlimiting examples of suitable Group IV metal complex of a polyvalent aryloxyether include [[2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl hafnium; and [[2',2'''-[1,3-propanediylbis(oxy-κO)[bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)] dimethyl hafnium.

The metal complexes are activated in various ways to yield catalyst compounds having a vacant coordination site that will coordinate, insert, and polymerize addition polymerizable monomers, especially olefin(s). For the purposes of this patent specification and appended claims, the term "activator" or "cocatalyst" means any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

In an embodiment, catalyst activation may involve formation of a cationic, partially cationic, or zwitterionic species, by means of proton transfer, oxidation, or other suitable activation process. The present invention is operable and fully enabled, regardless of whether or not such an identifiable cationic, partially cationic, or zwitterionic species actually results during the activation process, also known as an "ionization" process or "ionic activation process."

Ionizing cocatalysts may contain an active proton, or some other cation associated with, but not coordinated to, or only loosely coordinated to, an anion of the ionizing compound. Nonlimiting examples include ammonium cation containing salts, especially those containing trihydrocarbyl-substituted ammonium cations containing one or two $C_{10-40}$alkyl groups, especially methylbis(octodecyl)-ammonium- and methylbis(tetradecyl)-ammonium-cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation, derived from the commercially available long-chain amine, comprising a mixture of two $C_{14}$, $C_{16}$ or $C_{18}$ alkyl groups and one methyl group. Such amines are available from Chemtura Corp., under the trade name Kemamine™ T9701, and from Akzo-Nobel under the trade name Armeen™ M2HT. A most preferred ammonium salt activator is methyl di($C_{14-20}$ alkyl)ammonium tetrakis(pentafluorophenyl)borate.

Another suitable class of organometallic activators or cocatalysts is alumoxanes, also referred to as alkylalumoxanes. Alumoxanes are well known activators for use with metallocene type catalyst compounds to prepare addition polymerization catalysts. Nonlimiting examples include alumoxanes that are Lewis acid modified alumoxanes, especially tri($C_{3-6}$)alkylaluminum modified methylalumoxane, including tri(isobutyl)-aluminum modified methalumoxane, available commercially as MMAO-3A or tri(n-octyl)aluminum modified methalumoxane, available commercially as MMAO-12, from Akzo Nobel. Inc. Combinations of activators are also contemplated by the present disclosure, for example, alumoxanes and ionizing activators in combination.

Within the scope of this disclosure is the use of alumoxane(s) or modified alumoxane(s) as an activator or as a tertiary component. That is, the compound may be used alone, or in combination with other activators, either neutral or ionic, such as tri(alkyl)ammonium tetrakis(pentafluorophenyl)borate compounds, tris(perfluoroaryl) compounds, polyhalogenated heteroborane anions, and combinations of two or more of these materials. In this embodiment, the alumoxane may not contribute significantly to actual catalyst activation. Notwithstanding the foregoing, some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum-, or halogenated tri(hydrocarbyl)boron-modified alumoxanes, having from 1 to 10 carbons in each hydrocarbyl or halogenated hydrocarbyl group. Preferred Lewis acid-modified alumoxane compounds are tri(i-butyl)aluminum-modified methalumoxane and tri(n-octyl)aluminum modified methalumoxane containing from 10 to 30, or 15 to 25 mole percent i-butyl content, and 10 to 20, or 12 to 18 mole percent n-octyl content, respectively, the molar percents based on total alkyl ligand content. The alumoxane or Lewis acid-modified alumoxane activator is preferably utilized in molar ratios of cocatalyst:catalyst from 20-200:1, more preferably from 20-150:1, and most preferably from 20-80:1.

Because of the ability to be activated at relatively low levels of alumoxane or Lewis acid-modified alumoxane cocatalysts, while maintaining high catalyst efficiency, the present Group IV metal complexes can achieve reduced levels of cocatalyst by-products in the resulting polymer. This in turn allows the polymers to be employed in demanding applications, such as those requiring high clarity or low dielectric constant.

Article

The present disclosure provides an article. The article includes at least one component formed from the present composition. The composition can be any composition as disclosed above. Nonlimiting examples of suitable articles include articles including a nonwoven fabric adhered to an olefin-based polymer backsheet, such as diapers and feminine hygiene products.

In one embodiment, that article includes a substrate. In a further embodiment, the inventive composition is on at least one surface of the substrate.

In one embodiment, the inventive composition forms a seal between the at least one surface of the substrate and at least one surface of another substrate.

In one embodiment, the inventive composition is an adhesive composition.

In one embodiment, at least one substrate is a non-woven fabric. As used herein a "nonwoven fabric" is an assembly of monocomponent and/or bicomponent fibers (for example, core/sheath, islands in the sea, side-by side, segmented pie etc.) held together in a random web, such as by mechanical interlocking, or by fusing at least a portion of the fibers. The following descriptions provide nonlimiting procedures for producing nonwoven fabric. Fibers produced by melt spinning processes that include staple fiber spinning (including short spinning, long spinning), Spunbond, melt blown, or multiple combinations thereof, can be formed into a web, which is thereafter formed into a nonwoven fabric using binding technologies, such as carded thermal bonding, wet-laid, airlaid, airthrough bonding, calendar thermal bonding, hydro entanglement, needle punching, adhesive bonding or any combinations thereof.

In one embodiment, the present inventive composition forms a seal between a substrate that is a nonwoven fabric, and another substrate that is a back-sheet. The back-sheet is a sheet formed from a composition comprising an olefin-based polymer, and further comprising a majority amount of the olefin-based polymer, based on the weight of the composition.

An inventive composition may comprise two or more embodiments disclosed herein.

An inventive article may comprise a combination of two or more embodiments disclosed herein.

Definitions

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. The term polymer includes trace amounts of impurities, for example catalyst residue, that may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The term, "ethylene-based polymer," as used herein, refers to a polymer that comprises, in polymerized form, a majority amount of ethylene monomer (based on the weight of the polymer), and optionally may comprise one or more comonomers The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density is measured in accordance with ASTM D-792. The result is reported in gamma (g) per cubic centimeter, or g/cc.

Gel Permeation Chromatography (GPC)

A high temperature gel permeation chromatography (GPC) system, equipped with Robotic Assistant Deliver (RAD) system for sample preparation and sample injection. The concentration detector is an Infra-red detector (IR4) from Polymer Char Inc (Valencia, Spain). Data collection was performed using Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen purged 1,2,4-trichlorobenzene (TCB) containing approximately 200 ppm 2,6-di-t-butyl-4-methylphenol (BHT). The flow rate is 1.0 mL/min, and the injection volume was 200 µl. A 2 mg/mL sample concentration was prepared by dissolving the sample in $N_2$ purged and preheated TCB (containing 200 ppm BHT), for 2.5 hrs at 160° C. with gentle agitation.

The GPC column set was calibrated by running twenty narrow molecular weight distribution polystyrene standards. The molecular weight (MW) of the standards ranges from 580 to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PS}^{a_{PP}+1}}{K_{PP}} \right)^{\frac{1}{a_{PP}+1}}, \quad (1)$$

where $M_{PP}$ is PP equivalent MW, $M_{PS}$ is PS equivalent MW, log K and a values of Mark-Houwink coefficients for PP and PS are listed below in Table A.

TABLE A

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$Mn = \frac{\sum\limits_{i} Wf_i}{\sum\limits_{i} (Wf_i / M_i)}, \quad (2)$$

$$Mw = \frac{\sum\limits_{i} (Wf_i * M_i)}{\sum\limits_{i} Wf_i}, \quad (3)$$

where $Wf_i$ and $M_i$ are the weight fraction and molecular weight of elution component i, respectively.

Determining g'

The mass detector constant, laser light scattering detector constant, and the viscometer detector constant were determined using a polyethylene homopolymer reference with known value of the weight average molecular weight (Mw=120,000 g/mol, dn/dc=−0.104 mL/g, MWD=2.9) and intrinsic viscosity (1.873 dL/g). Above GPC test method was used for molecular weight information. The chromatographic concentrations were assumed low enough to eliminate addressing 2nd Virial coefficient effects (concentration effects on molecular weight).

The Systematic Approach for the determination of detector offset was implemented in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), using data obtained from the two detectors while analyzing the Dow reference of the broad linear polyethylene homopolymer (120,000 g/mol) and the narrow polystyrene standards. The Systematic Approach was used to optimize each detector offset to give molecular weight results as close as possible to those observed using the conventional GPC method.

The absolute weight average molecular weight Mw of samples, were characterized by the LS detector and IR-5 concentration detector using following Equation 1A:

$$Mw(\text{abs}) = K_{LS} * \frac{\sum (LS_i)}{\sum (IR_i)}, \quad \text{(Eqn. 1A)}$$

where, $\Sigma(LS_i)$ is the response area of LS detector, $\Sigma(IR_i)$ is the response area of IR-5 detector, and $K_{LS}$ is the instrument constant which was determined using the Dow internal reference with known concentration and the weight average molecular weight of 120,000 g/mol).

The absolute molecular weight of each elution volume was calculated by following Equation 2A:

$$M_{LS,i} = K_{LS} * \frac{LS_i}{IR_i}. \quad \text{(Eqn. 2A)}$$

The intrinsic viscosity of samples, were characterized by the viscometer detector and IR-5 concentration detector using following Equation 3A:

$$IVw = K_{IV} * \frac{\sum (DV_i)}{\sum (IR_i)}, \quad \text{(Eqn. 3A)}$$

where, $\Sigma(DV_i)$ is the response area of viscometer detector, $\Sigma(IR_i)$ is the response area of IR-5 detector, and $K_{IV}$ is the instrument constant which was determined using the Dow internal reference with known concentration and intrinsic viscosity of 1.873 dL/g).

The intrinsic viscosity of each elution volume was calculated by following Equation 4A:

$$IV_i = K_{IV} * \frac{DV_i}{IR_i}. \quad \text{(Eqn. 4A)}$$

The $M_{LS,i}$ and $IV_i$ values of each elution fraction were used to generate the Mark-Houwink plot of sample.

The g' value of Elastomer was calculated by following Equation 5A:

$$g_i'=(IV_{Sample,i}/IV_{linear\ reference,i}) \quad (Eqn.\ 5A),$$

where the $IV_{linear\ reference,i}$ is the intrinsic viscosity of the linear elastomer reference at equivalent absolute molecular weight as the sample. The recorded g' value was determined at the elution molecular weight=Mn of the polymer (g' at Mn value).

The linear elastomer reference here was defined as elastomer with "exactly" the same amount of comonomers as in the resin characterized. The Mark-Houwink plot of this linear elastomer reference is parallel to a linear homopolyethylene in the detected MW range, and overlap with the Mark-Houwink plot of the elastomer resin at low MW range: 20,000 to 30,000 g/mol in this case. The elastomer molecular weight and intrinsic viscosity were "corrected" by following methods using a short chain branching (SCB) parameter: $MW_{Elastomer}=(1+SCB\ wt\ \%)*MW_{Linear}$, while the $IV_{Elastomer}=IV_{Linear}/(1+SCB\ wt\ \%)$. The weight fraction of SCB, SCB wt %, and the SCB per 1000 carbon, SCB/1000C, has the relationship of: SCB wt %=[(SCB/1000C*X*14)/14000], where X is the comonomer type, and X=8 for octene and X=3 for propylene in this case.

The SCB and SCB distribution along with MWD can be obtained by using the composition mode of detector IR-5. The "SCB wt %" used here is empirical value which could be consistent but may not be exactly equal to the comonomer weight fractions in the elastomer, especially when the there are multiple comonomers in the elastomer.

By introducing "SCB correction" on absolute molecular weight and intrinsic viscosity, the factor g' decreasing caused by comonomers was eliminated. Based on the comonomer level in each elastomer sample, the "SCB correction" could be different. The main criteria of a "SCB correction" is overlay well with characterized elastomer sample at low MW fractions—which assumed there was no or very rare LCB. This was completed by adjusting the value of "SCB wt %" level.

¹H NMR Analysis (Total Unsaturation)

Samples are prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples are dissolved and homogenized by heating the tube and its contents to 110° C. The data is collected using a Bruker 400 MHz spectrometer, equipped with a Bruker Dual DUL high-temperature CryoProbe. The unsaturation data is collected using 4 scans per data file, a 15.6 second pulse repetition delay, with a sample temperature of 120° C. The acquisition is carried out using spectral width of 10,000 Hz and a file size of 16K data points. The presaturation experiment is run with a modified pulse sequence, 1c1prf2.zz1 using 100 scans per data file.

Calculations

Moles of H from propylene

Mol fraction propylene*(integral area δ 3.5-0.2 ppm)

Total moles propylene $\frac{\text{moles } H \text{ from propylene}}{6 \text{ protons}}$ Mol % vinyl unsaturation/mol propylene $\frac{100*\text{moles vinyl}}{\text{Total moles propylene}}$ Mol % Cis/Trans Unsaturation/mol propylene $\frac{100*\text{moles cis/trans}}{\text{Total moles propylene}}$ Mol % trisubstituted unsaturation/mol propylene $\frac{100*\text{moles trisub}}{\text{Total moles propylene}}$ Mol % vinylidene unsaturation/mol propylene $\frac{100*\text{moles vinylidene}}{\text{Total moles propylene}}$ Total mol % unsaturation/mol propylene = sum of the following Mol % vinyl+Mole % cis & trans+

Mol % trisub+Mol % vinylidene

Differential Scanning Calorimetry (DSC)

Differential Scanning calorimetry (DSC) is used to measure crystallinity in the polymers (e.g., ethylene-based (PE) polymers, or propylene-based (PP) polymers). About 5 mg to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 165 J/g, for PP, and multiplying this quantity by 100 (for example, % cryst.=($H_f$/165 J/g)×100 (for PP)).

Unless otherwise stated, melting point(s) ($T_m$) of each polymer is determined from the second heat curve (peak Tm), and the crystallization temperature ($T_c$) is determined from the first cooling curve (peak Tc).

Melt Viscosity

Melt viscosity is measured using a Brookfield Viscometer Model, and a Brookfield RV-DV-II-Pro viscometer spindle 31 at 177° C. for the propylene/C4-C10 alpha-olefin interpolymer; and using a viscometer spindle 27, at 150° C., for the inventive composition. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

¹³C NMR Experimental Procedure for Propylene Copolymers (Composition (% Comonomer) and Isotacticity (mm))

13C NMR is used for comonomer content and triad tacticity and is performed as follows:

Sample Preparation:

The samples were prepared by adding approximately 2.7 g of a 50/50 mixture of tetrachloroethane-d2/orthodichlorobenzene containing 0.025 M Cr(AcAc)3 to 0.20-0.30 g sample in a NORELL 1001-7 10 mm NMR tube. The samples were dissolved, and homogenized, by heating the tube and its contents to 150° C., using a heating block and heat gun. Each sample was visually inspected to ensure homogeneity.

Data Acquisition Parameters:

The data were collected using a Bruker 400 MHz spectrometer, equipped with a Bruker Dual DUL high-temperature CryoProbe. The data were acquired using 320 transients per data file, a 6 sec pulse repetition delay, 90 degree flip angles, and inverse gated decoupling with a sample temperature of 120° C. All measurements were made on non-spinning samples in locked mode. Samples were allowed to thermally equilibrate for seven minutes prior to data acquisition. Percent mm tacticity and wt % ethylene is then determined according to methods commonly used in the art.*

*References:
For P/E composition (wt % E): S. Di Martino and M. Kelchtermans; J. Appl. Polym. Sci., V 56, 1781-1787 (1995);
P/O assignments are found in: Chiari, Ysela L., "NMR Characterization and Isothermal Crystallization of Random Iso-Propylene Copolymers with Ethylene and 1-Octene Co-Units" (2007). Electronic Theses, Treatises and Dissertations. Paper 3820. (This thesis also references Busico for tacticity assignments and quantitation); Tacticity, detailed assignments: V. Busico, R. Cipullo; Prog. Polym. Sci. V 26, 443-533 (2001).

Data Analysis:

Tacticity was determined from the methyls region of the 13C NMR spectrum. The 0.5 Hz line broadening was applied prior to Fourier transforming the data. The integral for the entire region from approximately 22.5 to 19 ppm was set to a value of 100. The % mmmm and % mm were thus integrated directly as the regions from 22.5 to 21.69 ppm (% mmmm) and 22.5 to 21.3 ppm (% mm). (The integral for % mmmm is from approximately 22.5 to the valley between the mmmm satellite and the mmmr peak at 21.65 ppm.) The mmrr was obtained by integrating the peak at 21.11 ppm. These assignments are made based on a reference shift of 21.90 ppm for the PP mmmm peak. See Table B.

TABLE B

| Peak Center | Typical Integral Start (ppm) | Typical Integral End (ppm) | Pentads | Triads |
|---|---|---|---|---|
| 21.90 | 22.1 | 21.8 | mmmm | mm |
| 21.64 | 21.8 | 21.4 | mmmr | |
| 21.42 | 21.4 | 21.2 | rmmr | |
| 21.11 | 21.2 | 20.9 | mmrr | mr |
| 20.88 | 20.9 | 20.6 | mmrm + rmrr | |
| 20.70 | 20.6 | 20.4 | rmrm | |
| 20.36 | 20.4 | 20.2 | rrrr | rr |
| 20.15 | 20.2 | 20.1 | rrrm | |
| 19.92 | 20.1 | 19.8 | mrrm | |
| | ~22.5 | ~19.5 | All CH3s | |

Chemical shifts are measured in TCE/ODCB at 120-125° C., 400 MHz Cryoprobe.

Some embodiments of the present disclosure will now be described in detail in the following Examples.

Examples

1. Preparation of Propylene-Based Copolymers

The propylene/C4-C10 alpha-olefin interpolymer is produced utilizing a hafnium metal complex of a polyvalent aryloxyether catalyst.

Catalyst B is 2',2'''-[1,3-propanediylbis(oxy-κO)]bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl hafnium.

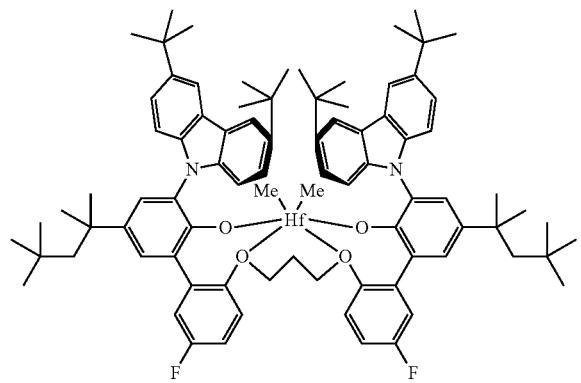

Catalyst B

Propylene based copolymers were continuously produced in a single, liquid phase reactor, using catalyst B and two co-catalysts. The primary cocatalyst was bis(hydrogenated tallow alkyl)methyl, tetrakis(pentafluorophenyl)borate(1-) amine (cocat. 1). The second cocatalyst was a mixture of aluminoxanes, iso-Bu Me, branched, cyclic and linear; modified methyl aluminoxane (MMAO-3A). The propylene-based copolymers were made using a solution phase, continuously stirred tank reactor (CSTR) that was comprised of a single vessel, equipped with a mechanical agitator that was used to maintain a homogeneous reaction environment. A positive displacement, metering pump was used to increase the pressure of the ISOPAR E solvent to approximately 600 psig for injection into the CSTR. The speed of the pump was manipulated to control the feed rate (e.g., 35 lbs/hr) at target.

A positive displacement, metering pump was used to increase the propylene pressure to approximately 625 psig, for injection into the ISOPAR E solvent, on the high pressure (discharge) side of the metering pump. The speed of the pump was manipulated to control the propylene feed rate (e.g., 5.5 lbs/hr) at target. Fresh hydrogen, at a feed pressure of 950 psig, was injected into the ISOPAR E solvent on the high pressure (discharge) side of the metering pump. A volumetric meter was used to measure the flow of hydrogen. For each copolymer manufactured, the feed rate of hydrogen was manipulated to meet the target viscosity for the resin.

For the propylene-ethylene copolymer, a coriolis meter was used to measure the flow of ethylene. The ethylene feed injected into the ISOPAR E solvent on the high pressure (discharge) side of the metering pump. The ethylene flow was manipulated to meet the target density for the resin.

For propylene/1-octene copolymer, a positive displacement, metering pump was used to increase the pressure of the 1-octene to approximately 625 psig for injection into the ISOPAR E solvent, on the high pressure (discharge) side of the metering pump. For the copolymer manufactured, the 1-octene flow was manipulated to meet the target density for the resin.

A heat exchanger was used to help maintain the reactor temperature at a set point. Reactants were injected into the bottom of the CSTR at a single location. Each of the three catalyst components, diluted in ISOPAR E, was separately injected using positive displacement metering pumps. Each pump injected its component into the reactor at a fluid pressure slightly greater than reactor pressure. Each pump's discharge pressure was approximately equal to 550 psig.

The flow rate of catalyst was manipulated to control the mass of propylene converted at a defined target (e.g., 86 wt %). The feed rate for each of the cocatalyst components was manipulated to control a defined molar ratio of the cocatalyst component to the catalyst component. The molar ratio of each cocatalyst component was manipulated to maximize the reactor stability and catalyst efficiency. The primary cocatalyst (Cocat. 1) was controlled at a molar ratio of 1.2 moles of cocat. 1 to 1 mole of hafnium (1.2:1) injected, and the second cocatalyst (MMAO-3A) was controlled at a molar ratio equal to 10 moles of aluminum per mole of hafnium (10:1) injected.

The polymer concentration (e.g., 12 wt %) in the reactor was indirectly controlled by holding the propylene conversion, as well as the total feed rate and composition to the reactor constant. Hot oil flowed through the jacket side of the CSTR. The hot oil temperature (e.g., 140° C.) was manipulated, primarily to overcome heat losses to the surrounding environment, to keep the reactor temperature (e.g., 130° C.) at target. The temperature gradient within the reaction liquor was minimized by running the agitator at high speed (e.g., 1,000 rpm). An automated valve in the reactor exit piping, downstream of the post reactor heat exchanger, was manipulated to keep the reactor pressure at set point (e.g., 525 psig). Since the reactor was hydraulically filled, the rate at which polymer solution exited the reactor was equivalent to the rate at which reactants were pumped into the reactor.

To terminate the polymerization reaction, a molar excess, with respect to the catalyst components, of deionized water was injected at the reactor outlet. The polymer solution temperature exiting the post reactor heat exchanger was approximately 250° C. The polymer was isolated from the polymer solution using devolatilizers.

The properties for the propylene/ethylene (P/E) and propylene/octene (P/O) copolymer, produce by the foregoing process are provided in Table 1 below.

Non-Woven HMA Formulations

To evaluate their performance in a non-woven formulation the P/E and P/O copolymers were formulated using the following formulation: 69.8 wt % copolymer, 20 wt % tackifier (REGALITE 1090 from Eastman Chemical); 10 wt % oil (CATENEX T14, available from Shell); and 0.2 wt % antioxidant (IRGANOX 1010 available from BASF).

Hot Melt Adhesive Preparation

A one liter, MOLTANI mixer was used to prepare two 600 gram batches of each adhesive formulation. All ingredients were pre-melted at 150° C. for a minimum of four hours, before mixing in the mixer. Two mixing stages were employed; three minutes at 60 rpm, followed by seven minutes at 120 rpm. The set temperature for the regulator was 148° C.

Brookfield Viscosity

The Brookfield viscosity of each formulated adhesive was measured at 150° C. in accordance with ASTM D-3236, using a Brookfield RV-DV-II-Pro viscometer and spindle SC4-27. See Table 5.

Compression Molding

A BUERKLE press LA 63 was used to compression mold "2 mm thick" plates of each adhesive formulation for tensile testing. The molding temperature was 110° C., and a molding cycle of 10 Bar for four minutes, followed by 50 Bar for three minutes, with controlled cooling at 15° C./min to 80° C.

Tensile Testing (Cohesion Properties)

The tensile properties of the base resin and each formulated HMA were measured on the compression molded plaques, according to test method EN 1896, at a testing speed of 300 mm/min, and using specimen number 1. Samples were kept at ambient conditions at least 48 hours prior to measuring. Tensile results are shown in Tables 2 and 3 below.

TABLE 2

Tensile Results

| Polymer | Tensile Strength at Break (MPa) | Tensile Strain at Break (%) |
|---|---|---|
| P/E | 2 | 169 |
| P/O | 12 | 730 |

TABLE 1

| Polymer | Brookfield Viscosity @177° C. (mPa·s) | Density (g/cm$^3$) | $^{13}$C NMR Comonomer (wt %)* | g' at $M_n$ | total unsaturation mole % per total mole propylene | mm** | Tm °C. | Tc °C. |
|---|---|---|---|---|---|---|---|---|
| P/E | 3982 | 0.864 | 13.1 | 1.00 | 0.0271 | 0.928 | 64.6 | 29.7 |
| P/O | 5285 | 0.864 | 23.3 | 1.00 | 0.0132 | 0.930 | 65.2 | −8.9 |

*wt % C8 present in propylene/octene copolymer (P/O) = 100 − (wt % C3); wt % C2 present in propylene/ethylene copolymer (P/E) = 100 − (wt % C3)
**Isotacticity (mm)

TABLE 3

Tensile Results

| HMA based on polymer | Tensile Strength at Break (MPa) | Tensile Strain at Break (%) |
|---|---|---|
| P/E | 1 | 67 |
| P/O | 2 | 322 |

Laminate Production

Non-woven/back-sheet laminates were prepared using NORDSON/JHT lab coater. Melting tank, transfer hose and melt applicators were all set at 150° C. The "adhesive add on weights" were 2, 3 and 5 gsm (grams/square meter). The melt pump rpm was kept constant at 27 rpm, and the line speed was typically 23, 16 and 10 m/min, to give the required coating weights of 2, 3 and 5 gsm, respectively. The lamination pressure was set at 1.5 bar. The slot coating die opening was perpendicular to the substrate, and positioned 4 cm below the mid-point of the rubber roll. The die was brought into contact with the substrate, giving a deflection of around 2 mm. A "12 gsm" hydrophobic PP non-woven, from FITESA, was used, along with a "16 gsm" breathable back-sheet from CLOPAY MICROPRO FPS K-16M. Final laminate configuration: PP non-woven/adhesive/back sheet.

Laminate Adhesion Testing

Test samples, 25 mm×150 mm, were cut in the machine direction from the adhesive laminate. Adhesion, via the measurement of peel force, was tested using a 180° peel test configuration according to ISO 11339, with a separation rate of 300 mm/min.

Laminate Aging

Initial adhesion measurements (typically 48 hours after production of the laminate) and adhesion after aging (2 weeks at 40° C.) are reported. Aging was carried out on "20 mm×180 mm" pre-cut samples. Adhesion results are shown in Tables 4 and 5 below.

TABLE 4

Peel Performance of the Formulated HMA

| HMA based on polymer | Peel Force (N/25 mm) HMA Coat Weight 2 gsm Initial/Aged | Peel Force (N/25 mm) HMA Coat Weight 3 gsm Initial/Aged | Peel Force (N/25 mm) HMA Coat Weight 5 gsm Initial/Aged |
|---|---|---|---|
| P/E | 0.8/1.0 | 0.8/1.1 | 1.2/1.4 |
| P/O | 1.0/1.5 | 3.1/2.3 | 2.5/2.0 |

TABLE 5

Viscosity of the formulated HMA

| HMA based on interpolymer | Brookfield Viscosity of the Adhesive @150° C. (mPa · s) |
|---|---|
| P/E | 2790 |
| P/O | 3450 |

As seen in Tables 2 and 3, the P/O copolymer has better (higher) tensile properties than the P/E copolymer. As seen in Tables 4 and 5, the P/O copolymer has better (higher) Peel Force values than the P/E copolymer. Other suitable polymers for adhesive formulations are shown below in Table 6.

TABLE 6

Propylene/hexene Copolymers

| | PH1 | PH2 | PH3 | PH4 | PH5 | PH6 |
|---|---|---|---|---|---|---|
| Density (g/cm³) | 0.865 | 0.866 | 0.871 | 0.869 | 0.876 | 0.875 |
| Brookfield Viscosity @177° C. (mPa · s) | 7510 | 2981 | 3047 | 7058 | 7500 | 3111 |

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A composition comprising:
   A) a propylene/C4-C10 alpha-olefin interpolymer comprising the following properties:
      (i) a total unsaturation per mole of propylene from 0.010 mole % to 0.030 mole %,
      (ii) a density from 0.855 g/cc to 0.890 g/cc, and
      (iii) a melt viscosity, at 177° C., from 500 cP to 200,000 cP.

2. The composition of claim 1, wherein the interpolymer further comprises an isotacticity (mm) greater than 0.85.

3. The composition of claim 1, further comprising the following:
   B) at least one tackifier;
   C) optionally, at least one oil;
   D) optionally at least one wax.

4. The composition of claim 1, wherein the propylene/C4-C10 alpha-olefin interpolymer has a g' value (at Mn) greater than 0.98.

5. The composition of claim 1, wherein the propylene/C4-C10 alpha-olefin interpolymer has a weight average molecular weight (Mw) from 10,000 to 500,000 g/mole.

6. The composition of claim 1, wherein the propylene/C4-C10 alpha-olefin interpolymer has a melt viscosity, at 177° C., from 500 cP to 50,000 cP.

7. The composition of claim 1, wherein propylene/C4-C10 alpha-olefin interpolymer has a melt viscosity, at 177° C., from 2000 cP to 10,000 cP.

8. The composition of claim 1, wherein the composition further comprises a propylene-based polymer wax that has a density 0.89 g/cc to 0.91 g/cc.

9. The composition of claim 1, wherein the composition has a melt viscosity, at 150° C., from 500 cP to 50,000 cP.

10. An article comprising at least one component formed from the composition of claim 1.

* * * * *